US010370039B2

(12) United States Patent
Geary et al.

(10) Patent No.: US 10,370,039 B2
(45) Date of Patent: Aug. 6, 2019

(54) FAIRING ASSEMBLY FOR A COMMERCIAL VEHICLE

(71) Applicant: Daimler AG, Stuttgart (DE)

(72) Inventors: Ryan Geary, Portland, OR (US); Michael Gatza, Happy Valley, OR (US); Nathan Hill, Sherwood, OR (US); Kristen Crosby, Klamath Falls, OR (US)

(73) Assignee: Daimler AG, Stuttgart (DE)

( * ) Notice: Subject to any disclaimer, the term of this patent is extended or adjusted under 35 U.S.C. 154(b) by 20 days.

(21) Appl. No.: 15/560,824

(22) PCT Filed: Mar. 9, 2016

(86) PCT No.: PCT/EP2016/000421
§ 371 (c)(1),
(2) Date: Sep. 22, 2017

(87) PCT Pub. No.: WO2016/150554
PCT Pub. Date: Sep. 29, 2016

(65) Prior Publication Data
US 2018/0111646 A1    Apr. 26, 2018

(30) Foreign Application Priority Data
Mar. 25, 2015    (GB) .................................. 1505052.9

(51) Int. Cl.
*B62D 25/18*    (2006.01)
*B62D 35/00*    (2006.01)
(Continued)

(52) U.S. Cl.
CPC .......... *B62D 25/184* (2013.01); *B60R 19/565* (2013.01); *B62D 25/168* (2013.01);
(Continued)

(58) Field of Classification Search
CPC .. B62D 25/184; B62D 25/168; B62D 25/188; B62D 35/001; B62D 35/008; B60R 19/565
See application file for complete search history.

(56) References Cited

U.S. PATENT DOCUMENTS

| 2,163,321 A | 6/1939 | Harroun et al. |
| 2014/0117712 A1* | 5/2014 | Butler .................. B62D 25/188 296/180.2 |
| 2015/0069784 A1 | 3/2015 | Song |

FOREIGN PATENT DOCUMENTS

| AT | 398 949 B | 2/1996 |
| DE | 196 14 083 A1 | 10/1997 |

(Continued)

OTHER PUBLICATIONS

PCT/EP2016/000421, International Search Report dated Jun. 1, 2016 (Three (3) pages).

*Primary Examiner* — Lori L Lyjak
(74) *Attorney, Agent, or Firm* — Crowell & Moring LLP

(57) ABSTRACT

A fairing assembly for a commercial vehicle is disclosed. The fairing assembly includes a fairing and a mounting system for mounting the fairing on a frame of the commercial vehicle. The mounting system includes a first mounting bracket assembly mounted on the fairing and a second mounting bracket assembly configured to be mounted on the frame. The mounting system is configured to hold the fairing in a covering position for laterally covering at least a major portion of a wheel of the commercial vehicle and allow the fairing and the first mounting bracket assembly to pivot from the covering position into an intermediate position and translationally move along the second mounting bracket assembly in a transverse direction of the commercial vehicle from the intermediate position into a stowed position in (Continued)

which the fairing rests on the second mounting bracket assembly via the first mounting bracket assembly.

10 Claims, 4 Drawing Sheets

(51) Int. Cl.
    *B62D 25/16*     (2006.01)
    *B60R 19/56*     (2006.01)

(52) U.S. Cl.
    CPC ......... *B62D 25/188* (2013.01); *B62D 35/001* (2013.01); *B62D 35/008* (2013.01)

(56) References Cited

FOREIGN PATENT DOCUMENTS

| | | | |
|---|---|---|---|
| DE | 10 2006 060 528 A1 | 6/2008 | |
| EP | 1 329 364 A2 | 7/2003 | |
| EP | 1 681 225 A1 | 7/2006 | |
| GB | 346577 | 4/1931 | |
| GB | 2538166 A * | 11/2016 | ........... B62D 25/163 |
| JP | 55-44010 A | 3/1980 | |
| JP | 8-91247 A | 4/1996 | |
| WO | WO 03/055723 A1 | 7/2003 | |
| WO | WO-2005115804 A1 * | 12/2005 | ........... B60R 19/565 |

* cited by examiner

FAIRING ASSEMBLY FOR A COMMERCIAL VEHICLE

BACKGROUND AND SUMMARY OF THE INVENTION

The invention relates to a fairing assembly for a commercial vehicle.

Fairing assemblies comprising at least one fairing respectively are used to cover at least a portion of at least one wheel of a commercial vehicle. Particularly, a drive wheel of the commercial vehicle is covered at least partially by the fairing. In other words, a fairing that covers at least one wheel of a commercial vehicle such as a heavy duty truck at least partially provides aerodynamic benefit so that fuel can be saved, i.e., a particularly high fuel economy can be realized. However, a fixed fairing prevents maintenance and inspection of the wheel, in particular of a tire and wheel end of the wheel.

Moreover, DE 196 14 083 A1 shows a lateral fairing for vehicles, in particular commercial vehicles, wherein the lateral fairing covers rear wheels of the vehicle at least partially. Moreover, the lateral fairing has at least one air duct through which air can flow thereby guiding the air from the outside to the inside and onto the wheels so as to ventilate wheel brakes.

Additionally, EP 1 681 225 A1 shows a fairing for a wheel of a heavy goods vehicle, the fairing extending laterally to the vicinity of the wheel during operation, so as to at least partly cover one side of the wheel, the fairing comprising a cowl and means for connecting the fairing to the vehicle body. The connecting means are designed to allow the release of the fairing from the vehicle body according to a release movement when the fairing is subjected to a force exceeding a preset value, in particular when the tire of the wheel bursts, and the fairing also including means which enable it to be retained to the vehicle body, during the release movement, to prevent the fairing from forming projectile material.

It is an object of the present invention to provide a fairing assembly by means of which particularly advantageous aerodynamics can be realized, wherein the fairing assembly further allows a particularly easy maintenance of a wheel to be covered at least partially by the fairing assembly.

The invention relates to a fairing assembly for a commercial vehicle, the fairing assembly comprising at least one fairing configured to laterally cover at least a major portion of a wheel of the commercial vehicle. Preferably, the wheel is a drive wheel of the commercial vehicle. In other words, at least a major portion of the wheel can be covered by the fairing in the transverse direction of the vehicle towards the outside. By covering at least a major portion of the wheel particularly advantageous aerodynamics of the commercial vehicle can be realized so that the fuel consumption of the commercial vehicle can be kept particularly low.

The fairing assembly according to the present invention further comprises a mounting system for mounting the fairing on a frame of the commercial vehicle. The mounting system has at least one first mounting bracket assembly mounted on the fairing. Moreover, the mounting system comprises at least one second mounting bracket assembly configured to be mounted on the frame. This means, in a completely assembled state of the commercial vehicle, the second mounting bracket assembly is attached to the frame of the commercial vehicle. Preferably, the second mounting bracket assembly is mounted on a longitudinal member of the frame.

According to the present invention the mounting system is configured to hold the fairing in a covering position for laterally covering at least the major portion of the wheel. This means, in the completely assembled state of the vehicle, at least the major portion of the wheel is covered by the fairing in the transverse direction of the vehicle towards the outside when the fairing is in its covering position.

The mounting system is further configured to, for uncovering the portion of the wheel, allow the fairing and the first mounting bracket assembly to be pivoted from the covering position into an intermediate position. Additionally, the mounting system is configured to allow the fairing and the first mounting bracket assembly to be translationally moved along the second mounting bracket assembly in the transverse direction of the vehicle from the intermediate position into at least one stowed position in which the fairing rests on the second mounting bracket assembly via the first mounting bracket assembly. Thus, the mounting system allows the fairing to articulate out of the way thereby uncovering the wheel so that the wheel and, for example, its tire and wheel end can be serviced particularly easily. Preferably, the mounting system allows the fairing to swing up over the tire of the wheel so as to allow for inspection of the tire and wheel end. Preferably, the fairing can also easily be completely removed, if needed, for more involved maintenance tasks like replacing the tire, etc. For example, if needed, from the stowed position the fairing and the first mounting bracket assembly attached to the fairing can be lifted up and out of the way during more involved maintenance tasks since, preferably, the first mounting bracket assembly and, thus, the fairing rests on top of the second mounting bracket assembly, but not secured in a new way. This means the fairing and the first mounting bracket assembly attached to the fairing can be taken off the second mounting bracket assembly without loosening any fastening members or using any tools. Thus, particularly advantageous aerodynamics of the vehicle can be realized, wherein the fairing assembly according to the present invention further allows realizing a particularly easy maintenance of the wheel.

In a particularly advantageous embodiment of the invention one of the mounting bracket assemblies comprises at least one receptacle, wherein the mounting system comprises at least one isolator mounted on the other bracket assembly. The isolator is configured to engage the receptacle in the covering position thereby holding the first mounting bracket assembly and the fairing in the covering position. This means, in the covering position, the fairing can be held on the frame via the isolator which can dampen movements of the fairing in relation to the frame. Moreover, the isolator is used to prevent direct metal contacts and, thus, noise when the fairing moves in relation to the frame and the second mounting bracket assembly. Preferably, the isolator is made of a plastic material.

In a further advantageous embodiment of the invention the mounting bracket assembly having the receptacle has at least one second receptacle arranged at a distance from the first receptacle, wherein the isolator is configured to engage the second receptacle in the stowed position so as to stabilize the fairing in the stowed position via the first mounting bracket assembly attached to the fairing. Thereby, the fairing can be easily moved between the covering position and the stowed position and held in the covering position and the stowed position in a particularly easy way by means of the isolator. By holding the fairing in the stowed position by means of the isolator a particularly easy maintenance can be realized since a movement of the fairing from the stowed position back into the covering position can be prevented by means of the isolator engaging the second receptacle.

In a further advantageous embodiment of the invention the mounting system comprises at least one second isolator mounted on the mounting bracket assembly on which the first isolator is mounted, wherein the second isolator is configured to engage the second receptacle in the covering position thereby holding the first mounting bracket assembly and the fairing in the covering position. In other words, the first mounting bracket assembly and the fairing can be held in the covering position by means of both isolators so that the risk of undesired movements of the fairing can be kept particularly low. Hence, particularly advantageous aerodynamics of the commercial vehicle can be realized. Preferably, the second isolator is made of a metallic material.

In order to realize a particularly easy and comfortable movement of the fairing from the covering position into the stowed position, in a further advantageous embodiment of the invention, the mounting system comprises at least one roller which is rotatably mounted on one of the mounting bracket assemblies, wherein the roller is configured to roll along the other mounting assembly when translationally moving the first mounting bracket assembly and the fairing from the intermediate position into the stowed position.

In a further advantageous embodiment of the invention the mounting system comprises at least one latch mounted on one of the mounting bracket assemblies. Moreover, the mounting system comprises at least one hook mounted on the other mounting bracket assembly. The hook is configured to engage the latch in the covering position thereby holding the first mounting assembly and the fairing in the covering position. Thus, undesired movements of the fairing from the covering position into the intermediate position can be prevented. Preferably, the latch is made of rubber so that undesired noise can be prevented.

In a further advantageous embodiment of the invention the mounting system comprises at least one slide rail mounted on one of the mounting bracket assemblies, the slide rail being configured to guide the other mounting bracket assembly when translationally moving the fairing from the intermediate position into the stowed position. Thus, the fairing can be easily moved by a person between the covering position and the stowed position.

In order to realize a particularly easy and comfortable movement of the fairing between the covering position and the stowed position, in a further embodiment of the invention, the slide rail is made of a plastic material.

The invention further relates to a commercial vehicle comprising at least one fairing assembly according to the present invention. Advantages and advantageous embodiments of the fairing assembly according to the present invention are to be regarded as advantages and advantageous embodiments of the commercial vehicle according to the present invention and vice versa.

Further advantages, features, and details of the invention derive from the following description of a preferred embodiment as well as from the drawings. The features and feature combinations previously mentioned in the description as well as the features and feature combinations mentioned in the following description of the figures and/or shown in the figures alone can be employed not only in the respectively indicated combination but also in other combinations or taken alone without leaving the scope of the invention.

DETAILED DESCRIPTION OF THE DRAWINGS

In the figures the same elements or elements having the same functions are indicated by the same reference signs.

Figure 1:
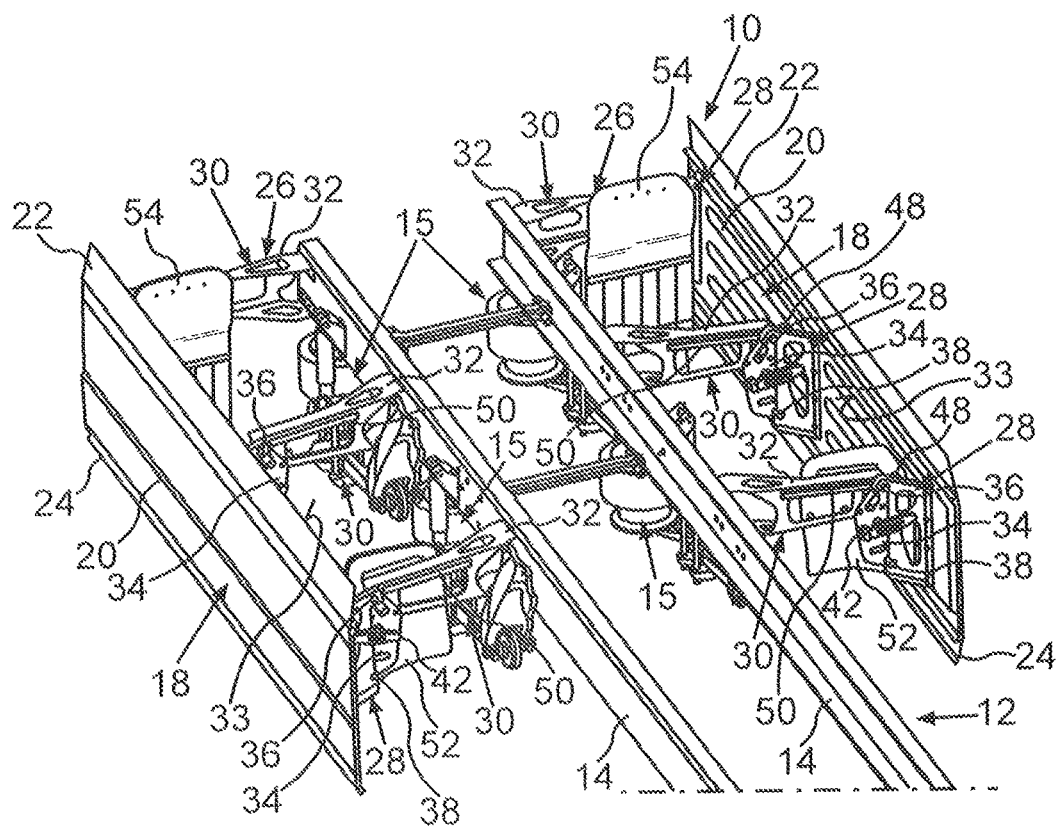
FIG. 1 is a schematic and perspective top view of a fairing assembly for a commercial vehicle, the fairing assembly comprising lateral fairings which can be pivoted and translationally moved between respective covering positions and respective stowed positions.

FIG. 1 shows a fairing assembly 10 for a commercial vehicle having a frame 12. As can be seen from FIG. 1, the frame 12 comprises at least two longitudinal members 14 which are arranged at a distance from each other in the transverse direction of the vehicle. For example, the frame 12 comprises at least one cross member which cannot be seen in FIG. 1, wherein the longitudinal members 14 are connected with each other by the cross member.

Figure 2:
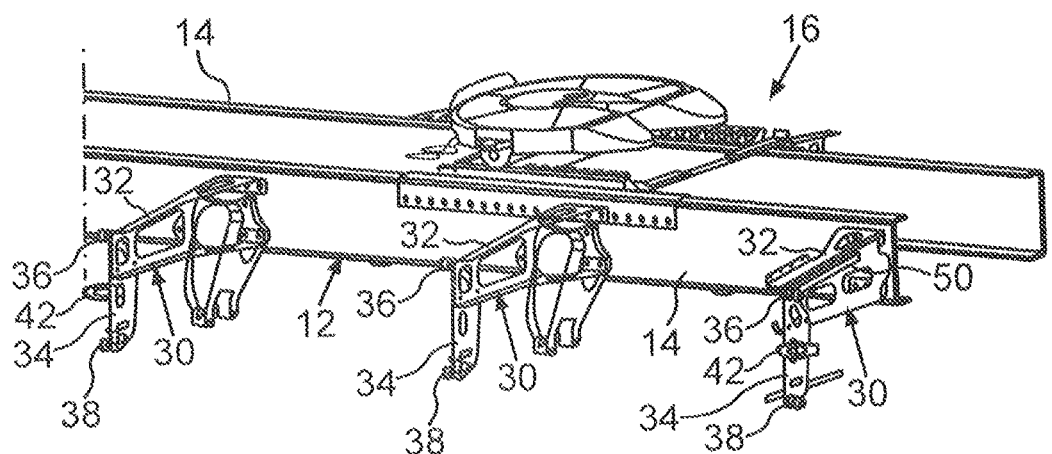
FIG. 2 is a schematic perspective view of second mounting bracket assemblies of the fairing assembly, the second mounting bracket assemblies being mounted on a longitudinal member of a frame of the commercial vehicle.

As can be seen from FIG. 2, the commercial vehicle can comprise a fifth wheel 16 mounted on the frame 12. Thus, for example, the commercial vehicle is configured as a tractor truck configured to pull a trailer. The trailer can be pivotably connected to the commercial vehicle by means of the fifth wheel 16. For example, the commercial vehicle has a tandem axle which is not shown in the figures. The tandem axle comprises a first axle and a second axle arranged behind the first axle in the longitudinal direction of the vehicle. The first axle and the second axle comprise respective wheels which are configured as, for example, drive wheels by means of which the commercial vehicle can be driven. The tandem axle and, thus, the drive wheels are mounted on the frame 12 in a completely assembled state of the commercial vehicle. The tandem axle is mounted on the frame 12 by means of respective suspensions 15 of a chassis of the commercial vehicle, the suspensions being configured as air suspensions.

As will be described in greater detail below, the fairing assembly 10 is used to laterally cover at least respective major portions of the drive wheels. For this purpose the fairing assembly 10 comprises respective fairings 18 configured to cover at least respective major portions of the drive wheels in the transverse direction of the vehicle towards the outside. Thus, the respective fairing 18 is also referred to as a drive wheel fairing (DWF). The respective fairing 18 comprises a rigid inner panel 20 and flexible rubber extensions 22 and 24 attached to the rigid inner panel 20. As can be seen from FIG. 1, the respective rubber extension 22 adjoins the rigid panel 20 in the vertical direction of the vehicle towards the top, wherein the respective flexible rubber extension 24 adjoins the respective rigid panel 20 in the vertical direction of the commercial vehicle towards the bottom. In other words, the flexible rubber extensions 22 and 24 are attached to the respective tops and bottoms of the rigid panels 20.

Figure 4:
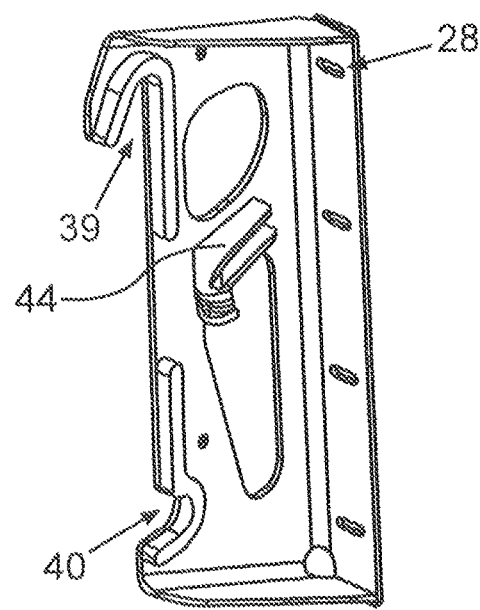
FIG. 4 is a schematic perspective view of a first mounting bracket assembly of the fairing assembly, the first mounting bracket assembly being configured to be mounted on one of the fairings.
Figure 5:
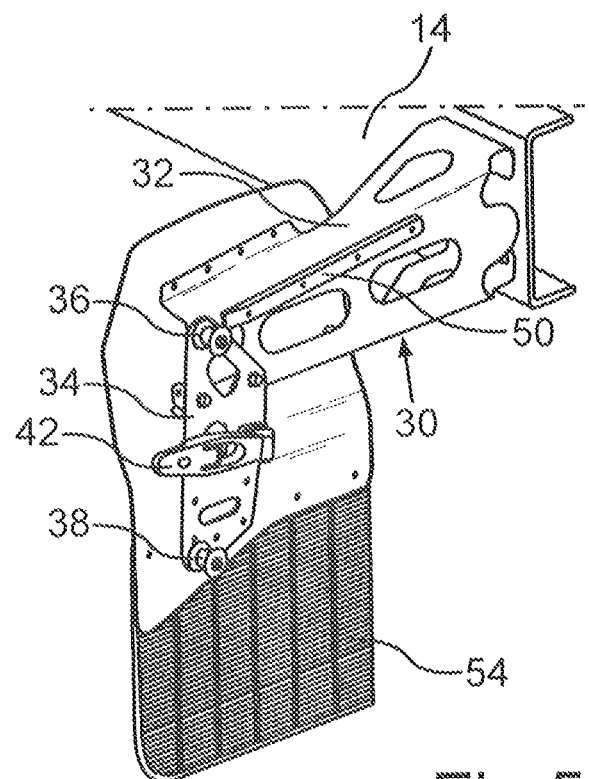
FIG. 5 is a schematic perspective view of one of the second mounting bracket assemblies.
Figure 6:
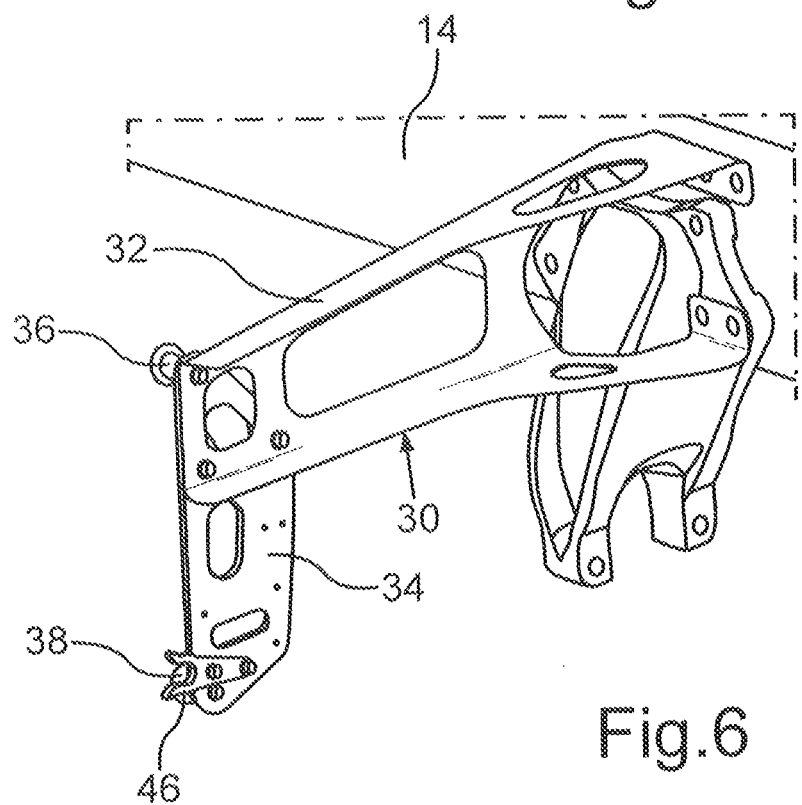
FIG. 6 is a further schematic perspective view of one of the second mounting bracket assemblies.
Figure 7:
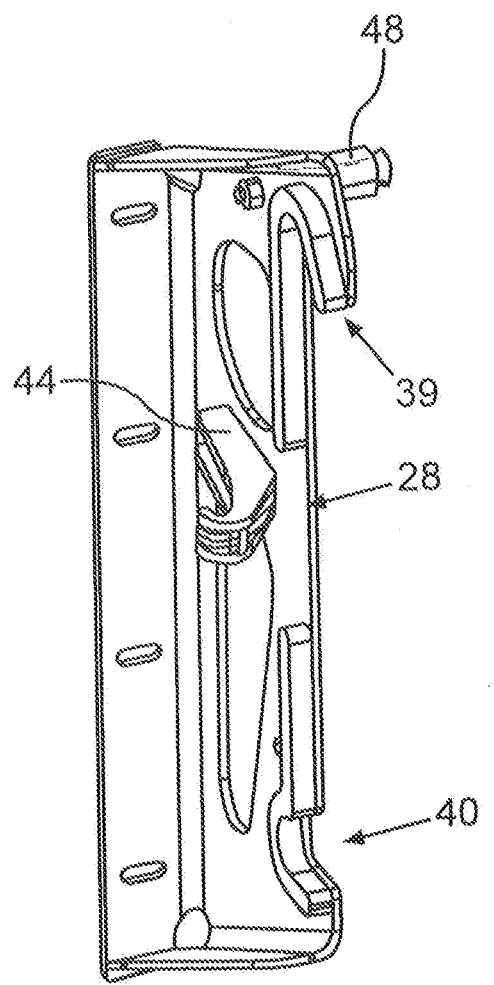
FIG. 7 is a further schematic perspective view of the first mounting bracket assembly.

The fairing assembly 10 further comprises mounting systems 26 for mounting the respective fairings 18 on the frame 12, in particular the longitudinal members 14. The respective mounting system 26 comprises first mounting bracket assemblies 28 mounted on the respective fairing 18. One of the first mounting bracket assemblies 28 is shown in FIGS. 4 and 7 respectively. In the present embodiment, the respective mounting system 26 comprises three first mounting bracket assemblies 28 which are arranged one after another in the longitudinal direction of the respective fairing 18, wherein the longitudinal direction of the fairing 18 corresponds to the longitudinal direction of the vehicle. Furthermore, the respective mounting system 26 comprises second mounting assemblies 30 which are mounted on the frame 12, i.e., the respective longitudinal member 14. As can be seen from FIGS. 1 to 3, the respective mounting system 26 comprises three second mounting bracket assemblies 30 which are arranged one after another in the longitudinal direction of the commercial vehicle. FIG. 5 shows the aft mounting bracket assembly 30. FIG. 6 shows the center mounting bracket assembly 30, and the front mounting bracket assembly 30 can be seen in FIGS. 1 to 3.

As can be seen from, for example, FIGS. 5 and 6 the respective second mounting bracket assembly 30 can comprise two bracket parts 32 and 34 which are individual components connected with each other. The bracket part 32 is mounted on the respective longitudinal member 14, wherein the bracket part 34 is attached to the bracket part 32. Alternatively, the bracket parts 32 and 34 can be formed in one piece so that, for example, the respective second mounting bracket assembly 30 can be formed in one piece.

With respect to a completely assembled state of the vehicle the front or forward mounting bracket assembly 30 is arranged in front of a front tire of at least one wheel of the first axle. The center mounting bracket assembly 30 is arranged between the front tire and at least one rear tire of at least one wheel of the second axle. Moreover, the aft mounting bracket assembly 30 is arranged behind the rear tire with respect to the longitudinal direction of the vehicle. Preferably, each of the axles comprises a plurality of, i.e., at least two, tires on each side of the commercial vehicle so that, for example, the first axle comprises four wheels, in particular drive wheels and, thus, four tires in the form of front tires. Moreover, the second axle comprises four wheels, in particular drive wheels and, thus, four tires in the form of rear tires.

The mounting systems 26 are configured to hold the respective fairings 18 in respective covering positions for laterally covering respective major portions of the respective wheels. The covering positions of the fairings 18 are shown in FIG. 1. With respect to the completely assembled state of the commercial vehicle at least respective major portions of the wheels of the axles are covered in the transverse direction of the vehicle towards the outside by the respective fairings 18 when the respective fairings 18 are in their covering positions. Thereby, particularly advantageous aerodynamics of the commercial vehicle can be realized so that the fuel consumption of the commercial vehicle can be kept particularly low.

The respective mounting system 26 is further configured to, for uncovering the respective portions, allow the respective fairing 18 and the first mounting bracket assemblies 28 mounted on the respective fairing 18 to be pivoted from the covering position into an intermediate position. Moreover, the respective mounting system 26 is configured to allow the respective fairing 18 and the respective first mounting bracket assemblies 28 to be translationally moved along the respective second mounting bracket assemblies 30 in the transverse direction of the vehicle inwardly from the intermediate position into at least one stowed position in which the respective fairing 18 rests on the respective second mounting bracket assemblies 30 via the respective first mounting bracket assemblies 28. Thus, the respective wheels and tires can be uncovered so that a particularly easy maintenance of the wheels can be realized.

With respect to the completely assembled state of the vehicle and with respect to the fairings 18 being in the covering positions the respective first mounting bracket assemblies 28 are attached to respective backsides 33 of the fairings 18, the respective backside 33 facing inwardly in the transverse direction of the vehicle. In other words, the respective backside 33 faces towards the respective wheels of the tandem axle.

As can be seen from FIGS. 4 and 7, the respective first mounting bracket assembly 28 has a first receptacle in the form of an engagement hook 39. Moreover, the mounting system comprises first isolators 36, wherein one of the first isolators 36 is mounted on one of the respective second mounting bracket assemblies 30. The respective first isolator 36 is configured to engage the engagement hook 39 in the covering position of the respective fairing 18 thereby holding the respective first mounting bracket assemblies 28 and the respective fairing 18 in the respective covering position. When the respective fairing 18 is lowered, i.e., moved into the covering position, the respective engagement hook 39 rests on the corresponding respective isolator 36 towards the top of the respective frame mounted mounting bracket assembly 30. Preferably, the isolator 36 is made of a plastic material. Moreover, the isolator 36 can be configured as a rubber isolator.

The side of the respective fairing mounted mounting bracket assembly 28 also presses laterally against a respective second isolator 38 mounted on the respective second mounting bracket assembly 30. As can be seen from FIG. 4, the respective first mounting bracket assembly 28 has a second receptacle in the form of a half round 40. The half round 40 is arranged at a distance from the engagement hook 39, wherein the respective second isolator 38 engages the corresponding half round 40 in the covering position of the respective fairing 18. Thus, the respective fairing 18 is firmly held in the covering position by means of the isolators 36 and 38 engaging the engagement hook 39 and the half round 40 respectively. Preferably, the respective isolator 38 is made of a plastic material. Moreover, the respective second isolator 38 can be configured as a rubber isolator.

Figure 3:
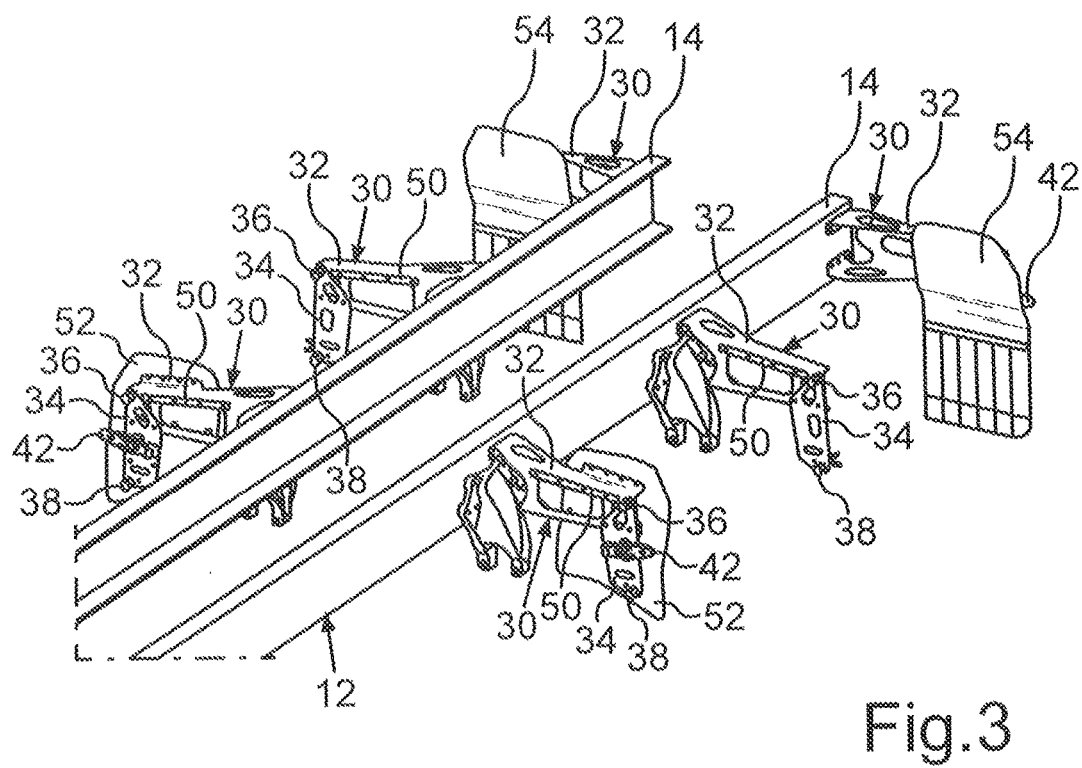
FIG. 3 is a further schematic perspective view of the second mounting bracket assemblies.

Moreover, the mounting system 26 comprises latches 42 which can be seen in FIGS. 2 and 3, for example. As can be seen from FIG. 2, one of the latches 42 is mounted on the forward mounting bracket assembly 30, wherein a second one of the latches 42 is mounted on the aft mounting bracket assembly 30. The respective latch 42 is made of rubber and arranged between the respective isolators 36 and 38. Moreover, the respective mounting system 26 comprises hooks 44, wherein one of the hooks 44 is mounted on the mounting bracket assembly 28 corresponding to the forward mounting bracket assembly 30, wherein another one of the hooks 44 is mounted on the mounting bracket assembly 28 corresponding to the aft mounting bracket assembly 30. The respective hook 44 is configured to engage the respective corresponding latch 42 in the respective covering position thereby holding the respective first mounting assembly 28 and the corresponding fairing 18 in the covering position. In other words, the latch 42 in between the isolators 36 and 38 firmly clamps the fairing mounted mounting bracket assemblies 28 to the frame mounted mounting bracket assemblies 30. Moreover, a clip 46 (FIG. 6) is attached to each of the center mounting bracket assemblies 30. Preferably, the clip 46 is made of a plastic material. The respective clip 46 provides some securing force on the center mounting bracket assembly 30 but does not require any latching. For example, in the covering position, a fastening element mounted on the center mounting bracket assembly engages the corresponding clip 46 so as to provide a clamp force by means of which the respective fairing 18 is held in the covering position.

To raise the respective fairing 18, the respective rubber latches 42 are unlatched and the respective fairing 18 is rotated upwards to an at least substantially horizontal position which is the intermediate position. Then the fairing 18 can be slid laterally towards the center of the commercial vehicle to the stowed position above the respective tires. As can be seen from FIG. 7, the respective mounting system 26 comprises rollers 48, wherein one of the rollers 48 is rotatably mounted on each of the first mounting bracket assemblies 28. Preferably, the respective roller 48 is made of a plastic material. When the fairing 18 is translationally moved from the intermediate position into the stowed position the respective rollers 48 on the top of the fairing mounted mounting bracket assemblies 28 roll along the top of the frame mounted mounting bracket assemblies 30 to keep friction particularly low so that the fairing 18 can be moved particularly easily and comfortably into the stowed position. For example, the respective roller 48 is rotatably mounted on the respective first mounting bracket assembly 28 by means of a respective bolt, in particular shoulder bolt.

Moreover, the respective mounting system 26 comprises slide rails 50, wherein one of the slide rails 50 is mounted on each of the mounting bracket assemblies 30. The respective slide rail 50 is also referred to as a skid, wherein, for example, the slide rail 50 is made of a plastic material. The slide rails 50 are configured to guide the first mounting bracket assemblies 28 when translationally moving the fairing 18 from the intermediate position into the stowed position. In other words, the slide rails 50 on the side of the frame mounted mounting bracket assemblies 30 ensure that the fairing 18 stays aligned and does not bind. Once the fairing 18 is slid all the way back into the stowed position, the half round 40 in the respective mounting bracket assembly 28 engages the corresponding first isolator 36 thereby stabilizing the fairing 18 in the stowed position which is also referred to as a raised position.

Also, if needed, from this raised position the respective fairing 18 can simply be lifted up and out of the way during more involved maintenance tasks, since the fairing 18 is resting on top of the frame mounted mounting bracket assemblies 30, but not secured in any way. Since the fairing 18 is merely resting on top of the frame mounted mounting bracket assemblies 30, damage to the fairing 18 and mounting system 26 is prevented respectively in the event that the suspension 15 losing air.

The fairing 18 will simply be lifted by the rear tires if the rear suspension 15 loses air pressure and the frame 12 drops in elevation. If the fairing 18 was securely attached to the frame mounted mounting bracket assemblies 30 in any way in the raised position, the fairing 18 and the mounting system 26 would get severely damaged in this event.

The fairing assembly 10 further comprises fairings in the form of quarter fairings 52 arranged in front of the respective front tires. As can be seen from FIG. 1, the quarter fairings 52 are mounted on the respective forward mounting bracket assemblies 30. Moreover, the fairing assembly 10 comprises mud flaps 54 arranged behind the respective rear tires. The mud flaps 54 are mounted on the aft mounting bracket assemblies 30. The quarter fairings 52 and the mud flaps 54 are also incorporated into the design of the fairing assembly 10 to control tire spray.

As can be seen from the figures, the mounting systems 26 allow the fairings 18 to swing up over the tires allowing for inspection of the tires and wheel ends. The fairings 18 can also easily be completely removed, if desired, for more involved maintenance tasks like replacing the tires, etc. Moreover, the fairings 18 provide fuel economic savings throughout aerodynamic improvement of the commercial vehicle, whilst the mounting systems 26 allow for necessary maintenance and inspection.

The invention claimed is:

1. A fairing assembly for a commercial vehicle, comprising:
   a fairing; and
   a mounting system for mounting the fairing on a frame of the commercial vehicle, wherein the mounting system includes:
      a first mounting bracket assembly mounted on the fairing; and
      a second mounting bracket assembly configured to be mounted on the frame;
   wherein the mounting system is configured to:
      hold the fairing in a covering position for laterally covering at least a major portion of a wheel of the commercial vehicle; and
      allow the fairing and the first mounting bracket assembly to pivot upwards from the covering position into an intermediate position, wherein the intermediate position is a horizontal position, and translationally move by rolling a roller of the first mounting bracket assembly on a top of the second mounting bracket assembly in a transverse direction of the commercial vehicle from the intermediate position into a stowed position in which the fairing rests on top of the second mounting bracket assembly via the first mounting bracket assembly.

2. The fairing assembly according to claim 1, wherein one of the first and second mounting bracket assemblies includes a first receptacle, wherein the mounting system further includes a first isolator mounted on the other one of the first and second mounting bracket assemblies, and wherein the first isolator engages the first receptacle in the covering position thereby holding the first mounting bracket assembly and the fairing in the covering position.

3. The fairing assembly according to claim 2, wherein the one of the first and second mounting bracket assemblies that includes the first receptacle has a second receptacle disposed at a distance from the first receptacle and wherein the first isolator engages the second receptacle in the stowed position so as to stabilize the fairing in the stowed position.

4. The fairing assembly according to claim 3, wherein the mounting system includes a second isolator mounted on the other one of the first and second mounting bracket assemblies that includes the first isolator and wherein the second isolator engages the second receptacle in the covering position thereby holding the first mounting bracket assembly and the fairing in the covering position.

5. A fairing assembly for a commercial vehicle, comprising:
   a fairing; and
   a mounting system for mounting the fairing on a frame of the commercial vehicle, wherein the mounting system includes:
      a first mounting bracket assembly mounted on the fairing; and
      a second mounting bracket assembly configured to be mounted on the frame;
   wherein the mounting system is configured to:
      hold the fairing in a covering position for laterally covering at least a major portion of a wheel of the commercial vehicle; and
      allow the fairing and the first mounting bracket assembly to pivot from the covering position into an intermediate position and translationally move along the second mounting bracket assembly in a transverse direction of the commercial vehicle from the intermediate position into a stowed position in which the fairing rests on the second mounting bracket assembly via the first mounting bracket assembly;
   wherein the mounting system further includes:
      a latch mounted on one of the first and second mounting bracket assemblies; and
      a hook mounted on the other one of the first and second mounting bracket assemblies;
      wherein the hook engages the latch in the covering position thereby holding the first mounting bracket assembly and the fairing in the covering position.

6. The fairing assembly according to claim 5, wherein the mounting system further includes a roller rotatably mounted on one of the first and second mounting bracket assemblies and wherein the roller rolls along the other one of the first and second mounting bracket assemblies when the first mounting bracket assembly and the fairing translationally move from the intermediate position into the stowed position.

7. The fairing assembly according to claim 5, wherein the latch is rubber.

8. The fairing assembly according to claim 1, wherein the mounting system further includes a slide rail mounted on one of the first and second mounting bracket assemblies and wherein the slide rail guides the other one of the first and second mounting bracket assemblies when the first mounting bracket assembly and the fairing are moved from the intermediate position into the stowed position.

9. The fairing assembly according to claim 8, wherein the slide rail is plastic.

10. A commercial vehicle comprising a fairing assembly according to claim 1.

* * * * *

UNITED STATES PATENT AND TRADEMARK OFFICE
CERTIFICATE OF CORRECTION

| | | |
|---|---|---|
| PATENT NO. | : 10,370,039 B2 | Page 1 of 1 |
| APPLICATION NO. | : 15/560824 | |
| DATED | : August 6, 2019 | |
| INVENTOR(S) | : Ryan Geary et al. | |

It is certified that error appears in the above-identified patent and that said Letters Patent is hereby corrected as shown below:

In the Specification

In the first line please insert:
--This invention was made with government support under DE-EE0003348 awarded by the U.S. Department of Energy. The government has certain rights in the invention.--

Signed and Sealed this
Fifteenth Day of October, 2024

Katherine Kelly Vidal
*Director of the United States Patent and Trademark Office*